(12) United States Patent
Mueller et al.

(10) Patent No.: US 11,394,548 B2
(45) Date of Patent: *Jul. 19, 2022

(54) SECURE PROVISIONING OF OPERATING SYSTEMS

(71) Applicant: MICROSOFT TECHNOLOGY LICENSING, LLC, Redmond, WA (US)

(72) Inventors: Ulrich Mueller, Redmond, WA (US); Aleksandr Mikhailovich Gershaft, Redmond, WA (US); Christopher W. McCarron, Hartford, CT (US); Marwan E. Jubran, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/565,480

(22) Filed: Sep. 9, 2019

(65) Prior Publication Data
US 2020/0112435 A1 Apr. 9, 2020

Related U.S. Application Data

(63) Continuation of application No. 15/043,224, filed on Feb. 12, 2016, now Pat. No. 10,425,229.

(51) Int. Cl.
*H04L 29/06* (2006.01)
*H04L 9/30* (2006.01)
(Continued)

(52) U.S. Cl.
CPC ............ *H04L 9/30* (2013.01); *G06F 8/63* (2013.01); *G06F 21/44* (2013.01); *G06F 21/57* (2013.01);
(Continued)

(58) Field of Classification Search
CPC .................................................. G06F 9/5077
See application file for complete search history.

(56) References Cited

U.S. PATENT DOCUMENTS

| 9,064,117 B1 * | 6/2015 | Worsley ............. G06F 11/1415 |
| 2010/0042992 A1 * | 2/2010 | Vasilevsky .......... G06F 9/45533 718/1 |

(Continued)

FOREIGN PATENT DOCUMENTS

| CN | 101951316 A | 1/2011 |
| CN | 102163266 A | 8/2011 |

OTHER PUBLICATIONS

"Office Action Issued in European Patent Application No. 17708353.2", dated Oct. 25, 2019, 7 Pages.
(Continued)

*Primary Examiner* — Jason K Gee
(74) *Attorney, Agent, or Firm* — Shook, Hardy & Bacon L.L.P.

(57) ABSTRACT

Methods, media, and systems for secure provisioning of servers within a cloud computing environment are provided for herein. In some embodiments, a management service can delegate provisioning of a server of the cloud computing environment to an imaging service. In response, the imaging service can generate an operating system image for the server and can utilize disk encryption to protect to operating system image. In embodiments, a volume encryption key of the disk encryption can be encrypted utilizing a public key of a trusted platform manager of the server, to produce an encrypted volume encryption key that is protected by the trusted platform module of the server. The encrypted operating system image and the encrypted volume encryption key can then be transmitted to the server to cause the server
(Continued)

to be provisioned with the operating system image. Other embodiments may be described and/or claimed herein.

20 Claims, 9 Drawing Sheets

(51) Int. Cl.
| | |
|---|---|
| *G06F 8/61* | (2018.01) |
| *G06F 21/44* | (2013.01) |
| *G06F 21/57* | (2013.01) |
| *G06F 21/72* | (2013.01) |
| *G06F 21/78* | (2013.01) |
| *H04L 9/08* | (2006.01) |
| *H04L 9/32* | (2006.01) |
| *H04L 9/40* | (2022.01) |

(52) U.S. Cl.
CPC .............. *G06F 21/72* (2013.01); *G06F 21/78* (2013.01); *H04L 9/0897* (2013.01); *H04L 9/3263* (2013.01); *H04L 63/0428* (2013.01); *H04L 2209/127* (2013.01)

(56) References Cited

U.S. PATENT DOCUMENTS

| | | | | |
|---|---|---|---|---|
| 2012/0254443 | A1* | 10/2012 | Ueda | ..................... G06F 9/5083 709/226 |
| 2013/0238786 | A1* | 9/2013 | Khesin | ............. H04L 29/08099 709/224 |
| 2014/0317394 | A1* | 10/2014 | Buhler | ................. G06F 9/4416 713/2 |
| 2015/0180319 | A1* | 6/2015 | Kimura | ............. H02K 15/0087 29/596 |

OTHER PUBLICATIONS

"First Office Action and Search Report Issued in Chinese Patent Application No. 201780011023.4", dated Jul. 1, 2021, 18 Pages.

\* cited by examiner

SECURE PROVISIONING OF OPERATING SYSTEMS

CROSS-REFERENCE TO RELATED APPLICATION

This application claims priority of U.S. Provisional application Ser. No. 15/043,224, filed Feb. 12, 2016, and titled "Secure Provisioning of Operating Systems", the contents of which is hereby incorporated by reference in its entirety.

BACKGROUND

In a cloud computing system, servers can be spread across a wide geographic area, even globally, in an effort to try and optimize network traffic between the cloud computing system and end users of the cloud computing system. While some of these servers are located within facilities that are managed by the operator of the cloud computing system, and therefore may be considered physically secure, other servers can be located in facilities that are managed by a third-party, and therefore may be considered to be physically unsecure. Provisioning of servers within these physically unsecure environments to provide the servers with a secure operating environment presents a host of complex issues that can be difficult to address.

SUMMARY

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

Embodiments described herein include methods, computer-storage media, and systems for securely provisioning servers in a cloud computing environment. In a particular embodiment, a secure server management service can be configured to receive a request from a server for secure provisioning of an operating system. The secure server management service can then retrieve a public key associated with a trusted platform module of the server. In embodiments, the public key can be retrieved from a data store in which the public key was stored prior to deployment of the server to a current physical location. The secure server management service can authenticate the server utilizing the public key, and, in response to a successful authentication, identify an imaging service of the cloud computing environment to which to delegate generating an operating system image for the server. The secure server management service can then transmit an image delegation notification to the identified imaging service to cause the identified imaging service to provision the server with an operating system image.

In another particular embodiment an imaging service of a cloud computing system can be configured to receive an image delegation notification that identifies a server that the imaging service is to provision with an operating system. The imaging service can then generate an operating system image for the server. Once the operating system image has been generated, the imaging service can encrypt the operating system image utilizing a volume encryption key of a disk encryption mechanism. In addition, the imaging service can bind or remotely seal the volume encryption key to the trusted platform module of the server. The encrypted operating system image can then be transmitted to the server to cause the server to be provisioned with the operating system image.

In addition, in some embodiments, a server may be configured to generate the server's own updated operating system image. In such embodiments, the server may receive, from a datacenter manager, an indication that the server is to provision itself with an updated operating system image. In response, the server can create an updated operating system (OS) image and can apply disk encryption to the updated OS image. The server can then seal a volume encryption key utilized in applying the disk encryption based on platform control register values of an expected system state of the server. The server can also generate an updated operating system image into the updated operating system volume; and can further move the updated OS image to an operating system volume in which the current operating system of the server resides.

BRIEF DESCRIPTION OF THE DRAWINGS

The present disclosure is described in detail below with reference to the attached drawing figures.

DETAILED DESCRIPTION

Figure 1:
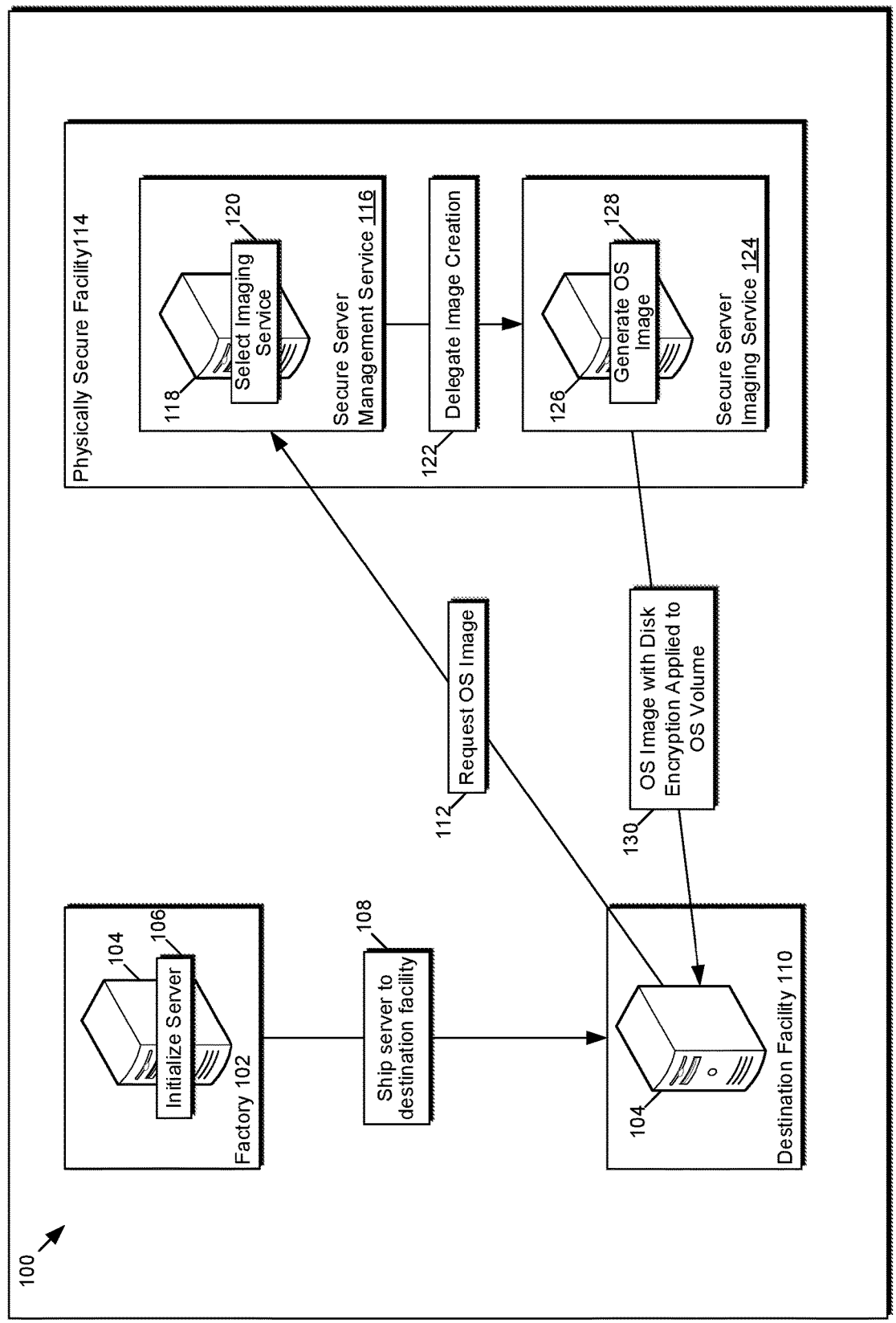
FIG. 1 is a diagram of a cloud computing environment in which various embodiments of the present disclosure can be employed.

Interconnection of computing systems has facilitated distributed computing systems, such as so-called "cloud" computing systems. "Cloud computing" generally refers to systems or resources for enabling ubiquitous, convenient, on-demand network access to a shared pool of configurable computing resources (e.g., networks, servers, storage, applications, services, etc.) that can be provisioned and released with reduced management effort or service provider interaction. A cloud model can be composed of various characteristics (e.g., on-demand self-service, broad network access, resource pooling, rapid elasticity, measured service, etc.), service models (e.g., Software as a Service ("SaaS"), Platform as a Service ("PaaS"), Infrastructure as a Service ("IaaS"), and deployment models (e.g., private cloud, community cloud, public cloud, hybrid cloud, etc.).

In a cloud computing system, servers may be located within physically secure facilities that are managed by an operator of the cloud computing system. In such a physically secure facility, the operator of the cloud computing system can be reasonably assured that a nefarious user is not able to gain physical access to these servers, and therefore cannot physically manipulate these servers. In an effort to ensure geographical dispersion of services within the cloud computing system, however, servers may also be located within facilities that are managed by a third-party, rather than the operator of the cloud computing system, and therefore are assumed to be physically unsecure. In such a physically unsecure facility, the operator of the cloud computing system does not have the assurance that a nefarious user is unable to gain physical access to these servers, and therefore may need to account for the possibility of such a nefarious user.

One of the steps for securing these physically unsecure servers is to provision each of these servers with a trustworthy operating system (OS). Typically, in order to install a trustworthy OS on a server that is to be located within an unsecure facility, the OS would initially be provisioned in a physically secure facility and then transferred to the physically unsecure facility. To ensure the trustworthiness of the OS, this provisioning would include, installing the OS to an OS volume of the server first and then enabling disk encryption, such as, for example BitLocker, on the OS volume as well as the data volumes of the server, while the server is at the physically secure facility. The disk encryption can provide a tamper-resistant operating environment by protecting the OS and data on the disks. In addition, firmware enforced secure boot processes may also be enabled within the physically secure facility to ensure the boot processes of the server are not tampered with. Once these servers are provisioned in the physically secure facility, these servers can be shipped to the intended geographical destination.

A problem with the provisioning described above, is that these servers can languish in shipping for months before finally arriving at the intended destination. During these intervening months, software patches directed towards fixing security issues with the originally trustworthy OS can be missed rendering the originally trustworthy OS no longer trustworthy.

One mechanism for attempting to install a trustworthy OS that is up to date on applicable software patches is to remotely provision each server with an OS once the server arrives at the intended destination. Once the OS is installed, disk encryption can be enabled to secure the OS. One problem with this approach, however, is that it cannot be assumed that an OS installed on an unencrypted disk has not been compromised before disk encryption is enabled. This is because a nefarious individual could have compromised the OS prior to enabling the disk encryption, thus effectively circumventing the disk encryption.

In light of the above considerations, various embodiments of the present disclosure are directed towards securely provisioning an OS to a remote server that is located in a physically unsecure facility. To this end, in a particular example embodiment of the present disclosure, a server that is to be located within a physically unsecure environment can be initialized within a physically secure environment. This initialization can comprise initializing a hardware encryption module (e.g., a trusted platform module) of the server and storage of a public key associated with the hardware encryption module in a database. The server can then be shipped to the intended destination where, upon power on of the server, control of the server is passed to a maintenance OS on the server. Such a maintenance OS can be loaded on the server in any number of ways (e.g., through a remote boot process or through an image of the maintenance OS that was installed on the server during the above discussed initialization). The maintenance OS can request an OS image for the server from a secure server management service (SSMS). The SSMS can in turn delegate the creation of the OS image for the server to an instance of a secure server imaging service (SSIS). The SSIS can generate the appropriate OS image for the server and encrypt the OS image utilizing a disk encryption key associated with a disk encryption mechanism of the server. The disk encryption key can then be remotely sealed by the hardware encryption module of the server being provisioned. The encrypted OS can then be transmitted to the server for installation via a provisioning agent of the maintenance OS. It will be appreciated that the above discussed embodiment is merely meant to illustrate one embodiment of the present disclosure and should not be treated as limiting. Additional embodiments, and alternatives thereto, will be readily understood via the description below.

FIG. 1 is a diagram of a cloud computing environment 100 in which various embodiments of the present disclosure can be employed. It will be appreciated that cloud computing environment 100 depicts only a portion of an entire cloud computing system for the sake of simplicity and ease of explanation. As such, it will be appreciated that any number of additional components (e.g., additional servers, services, facilities, etc.) can be included without departing from the scope of this disclosure.

As depicted cloud computing environment 100 includes physical locations of a cloud computing infrastructure. These physical locations are represented by factory 102, destination facility 110, and physically secure facility 114. Each of these physical locations will be discussed in turn, beginning with factory 102. Factory 102 represents a facility in which servers (e.g., server 104) may be initially assembled and/or readied for deployment to another physical location within cloud computing environment 100. While not designated as such within the depiction, it will be appreciated that factory 102 can be a physically secure facility.

While at factory 102, server 104 undergoes an initialization process, as indicated by block 106, to prepare server 104 for deployment into the cloud computing system. During this initialization process, a hardware encryption module of server 104 may be initialized. As an example, in one embodiment, the hardware encryption module is a trusted platform module (TPM). A TPM generally includes an embedded endorsement key (EK) that is unique to the TPM in which the endorsement key is embedded. As a result of the unique nature of the endorsement key, the endorsement key can be considered an identity of the TPM. The endorsement key of a TPM takes the form of an asymmetric encryption key. An asymmetric encryption key utilizes a first key for encrypting data, generally referred to as a public key, and a second key for decrypting encrypted data, generally referred to as a private key. As such, the endorsement key of the TPM includes a public portion (EKPub) and a private portion (EKPriv). The EKPriv is generally kept private within the TPM and is therefore not released outside the TPM in an effort to safeguard the EKPRiv. The EKPub, however, can be released outside the TPM to be utilized for a prescribed set of purposes, including, for example, authentication of a server in which the TPM has been installed. As such, in some instances, the initialization process carried out at factory 102 can include retrieval of the EKPub from the TPM. The EKPub can then be stored in a key database for later use in establishing a remote communication session, as described in greater detail below, with the TPM of server 104 and to identify server 104, once server 104 has been deployed to the intended destination. While specific embodiments are described herein in reference to the endorsement key of a TPM, it will be appreciated that another hardware encryption module and an equivalent of the TPM endorsement key can be utilized without departing from the scope of this disclosure.

A benefit of storing the EKPub for the TPM at the factory, as described above, is that the stored EKPub can be utilized with confidence that it is indeed the public portion of the endorsement key for the TPM. In addition, the stored EKPub provides confidence that this TPM, and thereby the server the TPM is installed on, belongs in the cloud computing system. For example, an attacker could attempt to trick the cloud computing system into provisioning a server that is not intended to be part of the cloud computing system. To accomplish this, the attacker could utilize a server with a compromised TPM. In such a scenario, the attacker could bypass the protection provided by the TPM thereby compromising aspects of the cloud computing system. These benefits are realized utilizing the stored EKPub, as opposed to requesting the EKPub from the TPM once the server is deployed. By having this a priori knowledge of the EKPub, certain attacks (e.g., man in the middle attack (MITMA), denial of service (DoS) attack, etc.) can be prevented or reduced, as described in greater detail below.

In addition to initializing a hardware encryption module of server 104 at factory 102, in some embodiments, a maintenance OS (MOS) may be also be installed during the initialization of server 104. In other embodiments, the MOS may be loaded once server 104 reaches the intended destination through a remote boot process, such as, for example, Pre-Boot Execution Environment (PXE) available from Intel Corporation of Santa Clara, Calif. As used herein, a MOS is an operating system that can be fully loaded into memory of a server to enable manipulation (e.g., reformatting) of permanent storage (e.g., a hard drive) that contains the MOS. An example of such a MOS includes Windows® Preinstallation Environment (WinPE) available from Microsoft Corp. of Redmond, Wash. In embodiments, the MOS can provide for the initialization of various hardware, software, and/or firmware of server 104 to bring the server into a preliminary operational state. In some embodiments, the MOS can include a MOS provisioning agent. The MOS provisioning agent can be configured to establish communication with a provisioning management service (e.g., secure server management service 116), via a network to which server 104 is communicatively coupled at the intended destination. Such a network can include any combination of wired and/or wireless networks. In embodiments, the MOS provisioning agent can be configured to manage aspects of securely provisioning server 104 with an operating system as described herein.

It will be noted that, in embodiments, the above described initialization does not include provisioning server 104 with a full, or primary, OS such as, for example, Windows® available from Microsoft Corp. of Redmond, Wash. A reason for this is that provisioning server 104 with a primary OS can add significant overhead at factory 102 and can also require continuous image refreshes of the primary OS image at factory 102, to ensure the latest updates have been incorporated within the primary OS. In addition, as mentioned previously, the time between shipping server 104 to the intended destination and server 104 booting up at the intended destination could be large enough for a primary OS image that was provisioned at factory 102 to have critical security vulnerabilities. As such, a primary OS that was provisioned at factory 102 may no longer be trustworthy by the time server 104 arrives at the intended destination and therefore may not be used as a basis to securely upgrade to an updated OS image.

Once server 104 has been initialized at factory 102, the server can be shipped to an intended destination (e.g., destination facility 110), as indicated by block 108. It will be appreciated that the shipping of server 104 to the intended destination can include an extended period of time, for example, international shipment, during which, server 104 is likely to languish in customs while traversing international borders. In addition, it will also be appreciated that server 104 could also be compromised by a malicious individual during shipment.

As mentioned previously, the intended destination (e.g., destination facility) of server 104 could be a physically unsecure facility. As used herein, a physically unsecure facility refers to a facility that is not subject to the control of the operator of the cloud computing system to which server 104 is to be connected. Once server 104 arrives at destination facility 110, the server can be physically installed at the destination facility 110, such as, for example, by physically attaching server 104 to a server rack within destination facility 110, coupling server 104 with a power source, and coupling server 104 with a network. Once installed, server 104 can be powered-up to initiate a boot process of server 104 (e.g., a unified extensible firmware interface (UEFI) boot process). The boot process of server 104 can enable server 104 to, among other things, initiate execution of the previously mentioned MOS and MOS provisioning agent. Once the MOS provisioning agent has begun executing, the MOS provisioning agent can be configured to submit a request for provisioning of an OS image, as depicted in block 112, to a secure server management service (SSMS) 116. As can be seen, SSMS 116 is hosted by server 118 and is located within physically secure facility 114. While SSMS 116 is depicted as a single instance instantiated, or hosted, on a single server, it will be appreciated that this is merely for simplicity of depiction and that there could be any number of instances of SSMS 116 operating within the cloud computing system across any number of servers, virtual or otherwise. In addition, while physically secure facility 114 is depicted as a single location, it will be appreciated that any number of physically secure facilities can be included without departing from the scope of the present disclosure. It will be appreciated that, when referencing a physically secure facility herein, that the physically secure facility is also assumed to employ network security as well, such that the facility itself can be trusted within the cloud computing system.

SSMS 116 can be configured to receive the request for provisioning of an OS image from the MOS provisioning agent of server 104. In response to the request, SSMS 116 can select an instance of a secure server imaging service (SSIS) (e.g., SSIS 124 hosted by server 126) to which to delegate the generation of an OS image for server 104, as indicated by block 120. The selection of the SSIS instance by SSMS can be based on any suitable criteria, or any combination of suitable criteria. For example, the criteria could be based on: load balancing concerns; geographic location concerns (e.g., distance from destination facility); network proximity concerns; available bandwidth; availability of needed files or data; patch status, etc. While in the depicted embodiment SSIS 124 is located within physically secure facility 114, it will be appreciated that, in some embodiments, the selected SSIS instance may be located within a physically unsecure environment. In such embodiments, the SSIS instance may be selected based upon a level of trustworthiness that the SSMS is able to establish for the SSIS instance. The level of trustworthiness could be based upon, for example, state data of the selected SSIS, which can include whether the server on which the SSIS instance is running is up to date on applicable software patches, has been reported stolen, is connected via an expected network address, etc. In addition, while SSIS 124 is depicted as being separate from SSMS 116, in some embodiments, SSMS 116 and SSIS 124 can be combined into a single service instance.

In some embodiments, SSMS 116 can be configured to authenticate server 104 prior to expending resources on processing the provisioning request. In such embodiments, by authenticating server 104 prior to expending resources on the provisioning request, SSMS 116 can guard against a denial of service (DoS) attack. Such a DoS attack could include a large number of false provisioning requests received by SSMS 116 from one or more malicious users. Through this large number of false provisioning requests, these malicious users can be attempting to flood SSMS 116 with a sufficient number of these false provisioning requests to render SSMS 116 unable to address legitimate requests, thereby denying the service of SSMS 116. In embodiments, such an authentication could utilize, for example, the previously stored EKPub.

Once an SSIS instance has been selected, SSMS 116 can transmit (e.g., via a network, bus, or any other suitable communication media) a message to the selected instance, SSIS 124. Such a message can, for example, identify server 104 as a provisioning target. In response, SSIS 124 can retrieve any files needed for generating a target OS image for server 104. These files can be retrieved from a local data store, a remote data store, or any combination thereof. As used herein, a data store can refer to a database, spreadsheet, flat file, delimited file, or any other mechanism that organizes data within a file or repository for retrieval. Once the necessary files have been retrieved for the target OS Image, SSIS 124 can generate an OS image from these files, as indicated by block 128. To accomplish this, in some embodiments, SSIS may first create a virtual hard disk (VHD) file that includes a partition for an OS volume in which to locate the OS image. Such a VHD file may also include partitions for an extensible firmware interface (EFI) volume, a partition for a maintenance OS volume, etc. Disk encryption could then be applied to the OS image to create an encrypted OS image (e.g., within the OS volume of the above discussed VHD file). It will be appreciated that the VHD file discussed above is merely meant to be illustrative of a possible delivery mechanism and that any other suitable delivery mechanism is explicitly contemplated herein.

On a high level, disk encryption (e.g., BitLocker) typically encrypts a disk volume using a symmetric key, generally referred to as a volume encryption key, in conjunction with block encryption algorithms (e.g. advanced encryption standard (AES)). Such a volume encryption key can be generated at the SSIS. Security of the volume encryption key can be important to maintaining security of the encrypted OS volume because a symmetric key can be utilized for both encryption of data and decryption of data encrypted with the symmetric key.

In addition to the above considerations, server 104 needs to be able to access the volume encryption key utilized in producing the encrypted OS volume in order to decrypt the encrypted OS volume. In an effort to protect the volume encryption key and enable server 104 to access the volume encryption key, SSIS 124 may utilize a public key of the TPM of server 104 to encrypt the volume encryption key, thus binding the volume encryption key to the TPM of server 104. In some embodiments, such a public key, along with the private portion of the key, could be generated and stored in the TPM at factory 102. In such embodiments, SSIS 124 does not need to rely on any information provided by server 104, other than the originally provided identifying information. As such, utilizing a stored public key can prevent a malicious user from being able to provide a false public key in an effort to compromise server 104, and possibly the rest of the cloud computing system, by mounting a man in the middle attack (MITMA). This may be necessary in the depicted embodiment because the destination facility 110 in which server 104 is located may not be a physically secure location.

In some embodiments, however, binding the volume encryption key to the TPM of server 104 by itself may not provide sufficient security. This is because an attacker with physical access to server 104 could use the TPM to decrypt the volume encryption key and gain access to the encrypted OS volume. An extra capability provided by a TPM is to measure key components such as executed firmware, firmware configuration, and an OS boot loader of server 104 and store these measurements into Platform Configuration Registers (PCRs) of the TPM. In some embodiments, to provide for additional security, the volume encryption key can be sealed to the TPM of server 104. To accomplish this, SSIS 124 can establish a remote session with the TPM of server 104 and can utilize this session to cause the TPM of server 104 to remotely seal the volume encryption key based on selected PCR values. In sealing the volume encryption key to the TPM of server 104, the selected PCR values act as a condition for decrypting the volume encryption key in order to load the encrypted OS volume. Such embodiments can effectively prevent access of the encrypted OS volume unless PCR values of the TPM of server 104 match the designated PCR values. As an example, the default registers used by BitLocker for use with UEFI Secure Boot are PCR[7] and PCR[11].

When sealing the volume encryption key, the expected values for the selected PCR registers would be designated by SSIS 124 at the time of generating the OS image. Because the MOS of server 104 may not be considered trustworthy at the time of the depicted provisioning process, it may not be desirable to request the PCR measurements of the TPM of server 104 to determine expected PCR values. This is because false PCR values could be provided by a malicious user. As such, in some embodiments a reference server that is similarly configured to server 104, at least with respect to any components measured for the selected PCR registers (e.g., UEFI firmware, boot loader, etc.), may be utilized to determine the expected PCR values. Such a reference server could be located within physically secure facility 114 or another physically secure facility (e.g. datacenter, test lab, or any other location under the physical control of the operator of the cloud computing system). These expected register values can be stored in a secure store (e.g., PCR Data Store 836 of FIG. 8) and may need to be updated each time a new hardware component gets introduced to the cloud computing system. Because PCR[7] measurements are expected to be substantially independent of the particular firmware version of the server on which it is measured, under normal circumstances recording of PCR[7] can be a one-time process per hardware component.

To perform the remote sealing discussed above, SSIS 124 may communicate with the TPM via the MOS provisioning agent of server 104. SSIS 124 can utilize a remote command execution against the TPM of server 104 to send messages to the MOS provisioning agent. These messages are TPM pass-through messages which the MOS provisioning agent delivers directly to the TPM. The TPM processes such messages and returns responses to the MOS provisioning agent which returns that response to SSIS 124. This arrangement allows SSIS 124 to directly use the TPM of server 104.

In embodiments, the imaging service establishes a salted authorization session with the TPM of server 104. In this case the imaging server knows the EKPub of the TPM of server 104 and knows that this is a valid EKPub because it was previously stored during the server initialization in block 106. SSIS 124 can use the TPM's endorsement key as the salt encryptor for the new session knowing that only that TPM of server 104 could correctly use the resulting messages. Once the authorization session is established SSIS 124 issues a command to the TPM of server 104 to seal the volume encryption key to anticipated PCR values for server 104.

In other embodiments, additional or alternative PCRs may be utilized for sealing the volume encryption key. For example, PCR[1] could be utilized to ensure a certain BIOS configuration, so any change in the BIOS settings compared to the reference server would prevent the primary OS of a server from booting. This might help mitigate some attack vectors, for example by disabling unused I/O ports in the BIOS configuration.

Figure 4:
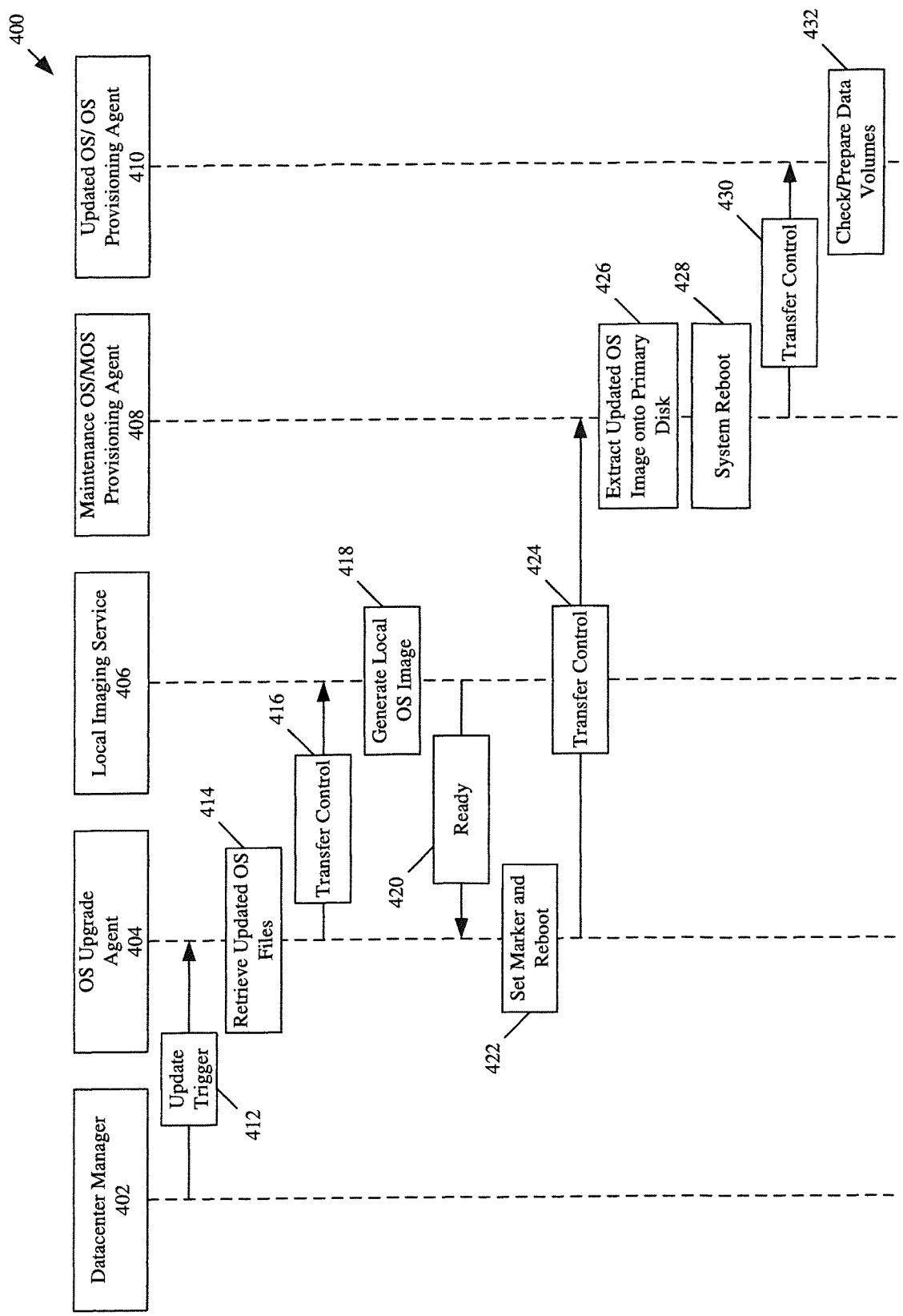
FIG. 4 is an interaction diagram depicting an illustrative process flow for updating an OS of a server, in accordance with various embodiments of the present disclosure.
Figure 5:
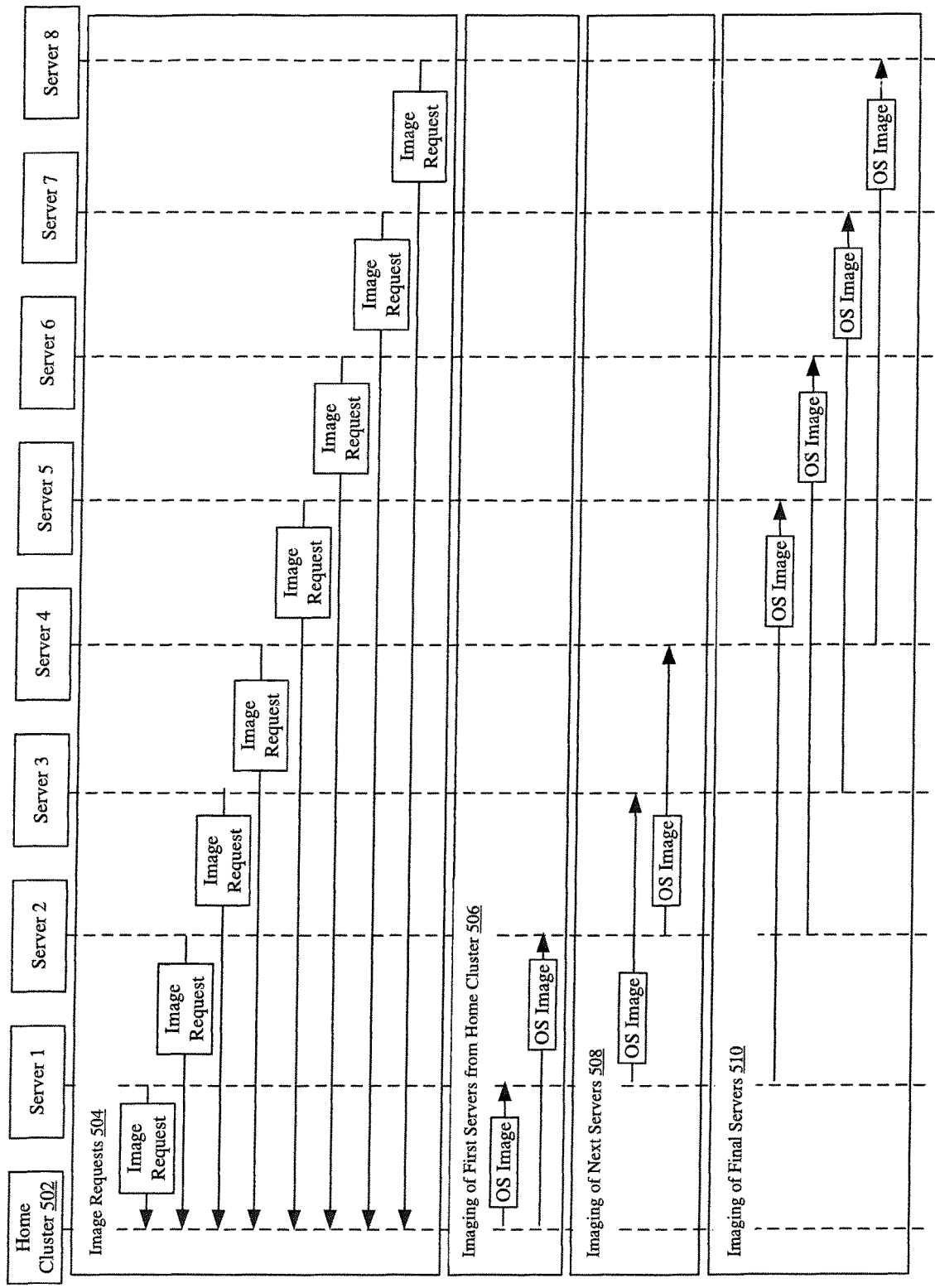
FIG. 5 is an interaction diagram depicting an illustrative process flow for de-centralized provisioning of servers, in accordance with various embodiments of the present disclosure.

In some embodiments, an imaging service may be included with the target OS image to enable server 104 to perform a self-update, as described in reference to FIG. 4, or to generate an image for another peer server, as described in reference to FIG. 5.

Once the target OS image has been generated, the OS image with disk encryption applied to the OS volume can be transmitted to server 104 at destination facility 110. Once the OS image arrives at server 104, server 104 can extract the OS image in a similar manner to that described in reference to block 426 of FIG. 4 and reboot to complete the installation.

Figure 2:
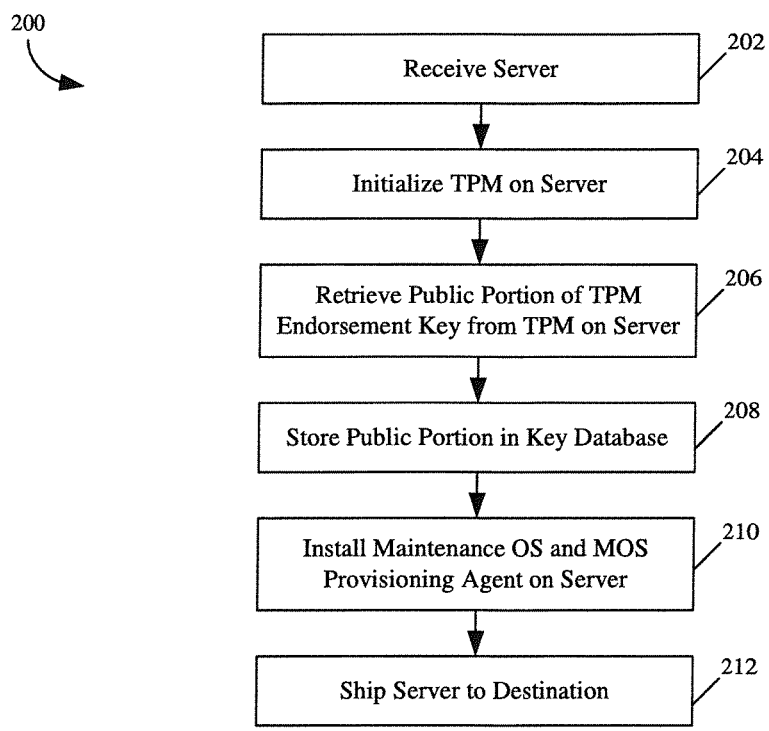
FIG. 2 is a flow diagram depicting an illustrative process flow for initializing a server for deployment at a factory in accordance with various embodiments of the present disclosure.

FIG. 2 is a flow diagram depicting an illustrative process flow 200 for initializing a server for deployment at a factory (e.g., factory 102 of FIG. 1), in accordance with various embodiments of the present disclosure. Portions of process flow 200 (e.g., the processes depicted by blocks 204-210) can be carried out by an automated initialization process performed at the factory to prepare servers for deployment into the cloud computing systems. As depicted process flow 200 begins at block 202 where a server is received at the factory. Once the server is received at the factory, at block 204 a trusted platform module (TPM), or any other hardware encryption module, can be initialized on the server.

As mentioned previously, a TPM generally includes an embedded endorsement key (EK) that is unique to the TPM in which the endorsement key is embedded. The endorsement key includes a public portion (EKPub) that is available for use outside the TPM for a set of prescribed services and a private portion (EKPriv) that is secured within the TPM. At block 206, the EKPub of the TPM can be retrieved from the TPM. At block 208, the EKPub can be stored in a key database (e.g., TPM key data store 838 of FIG. 8) for later use in establishing an authenticated communication session with the TPM of the server, once the server has been deployed to the intended destination.

A benefit of storing the EKPub for the TPM at the factory, as described above, is that the stored EKPub can be utilized with confidence that it is indeed the public portion of the endorsement key for the TPM. This is as opposed to requesting the EKPub from the TPM once the server is deployed. Having the EKPub of the TPM stored before deployment of the server can help in reducing or eliminating certain attacks (e.g., man in the middle attack (MITMA), denial of service (DoS) attack, etc.).

At block 210, a maintenance OS (MOS) (e.g., WinPE) is installed on the server along with a MOS provisioning agent. In embodiments, the MOS can provide for the initialization of various hardware, software, and/or firmware of the server to bring the server into a preliminary operational state. The MOS provisioning agent can be configured to establish communication with a provisioning management service (e.g., secure server management service 116 of FIG. 1). In embodiments, the MOS provisioning agent can be configured to manage aspects of securely provisioning the server with an OS image once the server is powered on at the intended destination.

Figure 3:
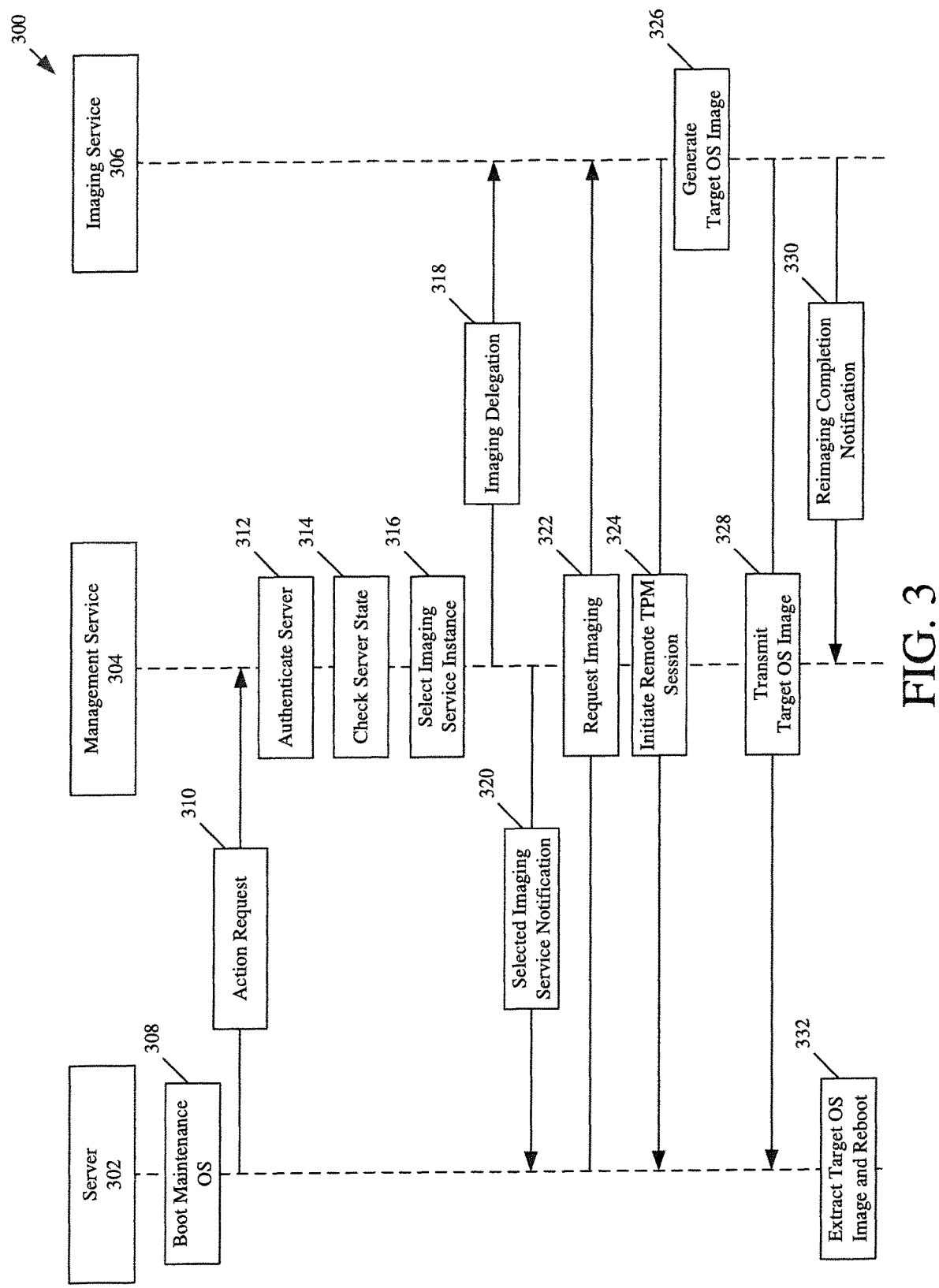
FIG. 3 is an interaction diagram depicting an illustrative process flow for provisioning a server, in accordance with various embodiments of the present disclosure.

FIG. 3 is an interaction diagram depicting an illustrative process flow 300 for provisioning a server, in accordance with various embodiments of the present disclosure. As can be seen, the interaction diagram depicts the interaction of three entities, a server 302, a provisioning management service 304 (e.g., SSMS 116 of FIG. 1), and an imaging service 306 (e.g., SSIS 124 of FIG. 1). Process flow 300 can begin at block 308, where server 302 is booted into a maintenance OS (MOS). In embodiments, the MOS can provide for the initialization of various hardware, software, and/or firmware of server 302 to bring server 302 into a preliminary operational state. This provisioning can be initial provisioning of a server or provisioning of a server after hardware replacement (e.g., hard disk) for upgrade or maintenance.

At block 310, the MOS of server 302, or a provisioning agent of MOS of server 302, can submit an action request to management service 304. In embodiments where process flow 300 is an initial provisioning of server 302 at a destination facility (e.g., destination facility 110) action request 310 can simply be a request for provisioning of a primary OS for server 302. In other embodiments where server 302 has already been provisioned with a primary OS, the action request of block 310 can be a status check that is regularly performed by the MOS of server 302 upon boot of server 302. In embodiments, the action request includes an identifier of server 302 to enable management service 304 to identify various state information associated with server 302. In such an embodiment, the identifier could be any unique identifier including, but not limited to a public portion of a key (e.g., EKPub) of the TPM of server 302. Action request 310 can be submitted to maintenance service 304 in any suitable protocol (e.g., hypertext terminal protocol (HTTP)) over any suitable network connection (e.g., the internet).

At block 312, management service 304 can authenticate server 302. In embodiments where the unique identifier is the EKPub of the TPM of server 302, this can be accomplished by verifying the EKPub against a database of known EKPubs. As an additional, or alternative, level of authentication, in some embodiments, management service 304 can perform a challenge-response authentication of server 302. This can be accomplished by encrypting a message utilizing a known public key of a public-private key pair protected by the TPM of server 302 and transmitting the encrypted message to server 302, as a challenge. If server 302 can decrypt the message and return the decrypted message in response to the challenge, then management service 304 can be substantially confident that the server identified within action request 310 is indeed server 302.

At block 314, management service 304 can check a state of server 302. This state check can be based on the identifier of server 302 that was included within action request 310. Such a state check can include, for example, determining whether server 302 has been reported stolen; whether server 302 is connecting using an expected IP address to determine, for example, that server 302 hasn't been relocated unexpectedly; or any other suitable state check. In addition, management service 304 could also perform a host attestation to ensure that the OS of server 302 is in a known good state. In addition, a TPM may also include capabilities such as remote attestation which can be utilized to confirm a state of server 302. Remote attestation creates a nearly unforgeable hash key summary of the hardware and software of the server. Such a system may allow a third party to verify that the software has not been changed.

At block 316, if the server state determined at block 314 is satisfactory (e.g., server 302 hasn't been reported stolen), management service 304 can select an instance of an imaging service to which to delegate creating an OS image for server 302. Instances of imaging services can be run on servers throughout the cloud computing system both on a home cluster and outside the home cluster. As used herein, a home cluster refers to a set of servers used for management purposes within the cloud computing system. In some embodiments, there could be any number of home clusters throughout the cloud computing system essentially partitioning the cloud computing system. The selection of the imaging service instance can be based on any suitable criteria, or any combination of suitable criteria. For example, the criteria could be based on: load balancing/scheduling concerns; geographic location concerns (e.g., distance from destination facility); network proximity; available bandwidth; availability of needed files or data; etc. In a particular embodiment, the imaging service instance is selected based on geographic proximity, or network proximity, to server 302. As used herein, network proximity can include any measure of distance between two nodes within a network (e.g., number of intermediate network nodes). In such an embodiment, if a suitable imaging service instance is not found within a sufficient proximity, either network or geographic, of server 302, then the selection of the imaging instance can default to an imaging instance within the home cluster of server 302.

Once an imaging service instance has been selected, management service 304 can send an image delegation notification 318 to the selected imaging service instance, imaging service 306. The imaging delegation notification can include various information concerning the delegation including, for example, any combination of: an identifier associated with server 302; an identifier of an OS version for the image; identifiers of files to be included within the OS image (e.g., a manifest); an address (e.g., internet protocol (IP) address) to utilize in communicating with server 302; the EKPub of the TPM of server 302, etc.

In addition, management service 304 can send a notification 320 to server 302 of the selected imaging service instance. Notification 320 can include various information concerning the delegation of the selected imaging service instance including, for example, an identifier associated with imaging service instance 306; an address (e.g., IP address) to utilize in communicating with server 302, etc.

At block 322, in some embodiments, server 302 can submit an imaging request to imaging service 306. Such an imaging request can also include an identifier of server 302. The identifier of server 302 can be utilized to, for example, enable imaging service 306 to match the imaging request 322 with the image delegation notification from management service 304. In other embodiments, imaging service 306 may initialize communication with server 302, rather than awaiting imaging request of block 322. In such an embodiment, it will be appreciated that imaging request 322 could be omitted.

Once the imaging request is received by imaging service 306, imaging service 306 can utilize the information in image delegation notification 318, or image request 322, to establish a remote TPM session with the TPM of server 302 at block 324. To accomplish this, server 302 may initially utilize an EKPub of the TPM of server 302 to authenticate the imaging request. In such an embodiment, the EKPub utilized by the imaging service could be an EKPub that was stored prior to deployment of server 302 to the current physical location of server 302 (e.g., block 208 of FIG. 2). This would act to ensure that any messages transmitted between imaging service 306 and server 302 would be protected by the TPM of server 302, without relying on server 302, which could be compromised, to provide this information.

At block 326, imaging service 306 generates a target OS image for server 302. Disk encryption would then be applied, utilizing a volume encryption key generated by imaging service 306, to the OS image to create an encrypted OS image, in a similar manner to that described above in reference to block 128 of FIG. 1. In addition, the volume encryption key can be protected by sealing the volume encryption key to the TPM of server 302. This can be accomplished via a remote seal command issued over the remote session established at block 324. Such a remote seal command is supported, for example, by TPM Specification 2.0 established by the Trusted Computing Group in 2015. More detailed discussion of the remote session is included in reference to FIG. 1, above.

In some embodiments, an imaging service may be included with the target OS image to enable server 302 to perform a self-update, as described in reference to FIG. 4, or to generate an image for another server, as described in reference to FIG. 5.

Once the target OS image has been generated in block 326, the target OS image can be transmitted to server 302, as indicated by block 328. Once server 302 has received the target OS image from imaging service 306, the target OS image can be extracted onto server 302 at block 332, via, for example, the MOS of server 302 or the MOS provisioning agent of server 302. This extraction process can be similar to the process described in reference to block 426, of FIG. 4. After the extraction of the target OS image, server 302 can then reboot to complete installation of the target OS image.

FIG. 4 is an interaction diagram depicting an illustrative process flow 400 for updating an OS of a server, in accordance with various embodiments of the present disclosure. As can be seen, the interaction diagram depicts the interaction of five entities, a datacenter manager 402, an OS upgrade agent 404, a local imaging service 406, a maintenance OS (MOS)/MOS Provisioning Agent 408, and an updated OS/OS Provisioning Agent 410. The OS upgrade agent 404, local imaging service 406, maintenance OS (MOS)/MOS Provisioning Agent 408, and updated OS/OS Provisioning Agent 410, depict entities that reside on a server being provisioned with an updated OS (e.g., server 104 of FIG. 1 or server 302 of FIG. 3). Process flow 400 depicts an instance where the server being updated has already been initially provisioned as described in reference to FIGS. 1 and 3. In addition, the server is deemed sufficiently trustworthy by a provisioning management service (e.g., SSMS 116 of FIG. 1 or management service 306 of FIG. 3), in a similar manner to that described in reference to blocks 312 and 314 of FIG. 3. It will be appreciated that, in some embodiments, an initial interaction between the server being updated and the management service, similar to that described in reference to blocks 308-316 of FIG. 3, may have occurred prior to block 412 or between blocks 412 and 414. In such an embodiment, local imaging service 406 would correspond with the delegated imaging service determined at block 316 of FIG. 3.

Process flow 400 can begin at block 412, where datacenter manager 402 transmits (e.g., via a network) an update trigger. The update trigger can be configured to cause OS upgrade agent 404 of the server to initiate the updating of the OS on the server. In some embodiments, the update trigger can include, for example a listing (e.g., manifest) of the files that are needed for generating an updated OS image and/or a location of where those files can be obtained. At block 414, OS upgrade agent 404 can retrieve the updated OS files, or the files needed for updating the current OS image.

Once these files are retrieved, at block 416, control can be transferred to a local imaging service 406 that resides on the server being updated. At block 418, local imaging service 406 can utilize the updated OS files retrieved by OS upgrade agent 404 to generate an updated local OS image. Disk encryption would then be applied to the OS image to create an encrypted OS image, in a similar manner to that described in reference to block 326 of FIG. 3. In at least one embodiment, imaging service 406 may first create a virtual hard disk (VHD) file on an unencrypted portion of a local hard disk of the server being updated. This VHD file can include a partition for the OS volume. Such a VHD file may also include partitions for an extensible firmware interface (EFI) volume, a partition for a maintenance OS, etc. In other embodiments, the OS image may be stored to any location of the local disk (e.g., a native disk partition). In addition, as mentioned previously, in some embodiments, to provide for additional security, the volume encryption key may be remotely sealed by the TPM of the server, as described in reference to block 326 of FIG. 3. In some embodiments, the expected PCR values used in sealing the volume encryption key can be set based on PCR values of an expected system state of the server. In other embodiments, PCR values could be predicted for particular changes (e.g., utilizing a PCR data store or other mechanism that can correlate particular system changes with expected PCR values). For example, the new OS could utilize different boot loader that would result in changes to some PCR values. In such an example, the volume encryption key could be sealed to predicted PCR values for the system based on the different boot loader.

At block 420, once local imaging service 406 has generated the updated local OS image, local imaging service 406 can notify OS upgrade agent 404 that the updated local OS image is ready. In some embodiments, this notification can include a location of the updated local OS image within the hard disks of the server being updated. In response to the notification in block 420, OS upgrade agent can set a marker file for a MOS of the server being upgraded, in an effort to notify the MOS of the location of the OS image. Once the marker file is set, OS upgrade agent can cause the server to reboot.

Upon rebooting, control of the server can be transferred from the OS Upgrade Agent 404 to the MOS/MOS provisioning agent 408 of the server. The MOS/MOS provisioning agent 408 can retrieve the marker file that was set in block 420. The marker file can then be utilized to identify the location of the OS image generated at block 418. The MOS can, in some embodiments, copy, for example, via a bitwise copy, the OS image into a local OS volume of the hard disk of the server, thus replacing the previous OS with the updated OS. A bitwise copy generally refers to copying a file bit by bit to ensure an exact copy of the file. In other embodiments, the updated OS image can be generated in a format that can be booted from directly. For example, some operating environments support booting from a VHD directly. In still other embodiments, the updated OS image may reside in a native partition and the MOS may merely change the boot order to refer to this native partition. This change could be temporary in nature, at least at first, to allow reverting to the previous OS in the event of issues with the updated OS image. In addition, returning to the VHD example embodiment discussed above, any corresponding EFI and/or MOS volumes, if such volumes are included within the VHD file, can also be copied over. In the event that any of the partition sizes of the local disk is insufficient, the MOS/MOS provisioning agent 408 can repartition the hard disk on demand. It should be noted, that because the MOS would not have access the volume encryption key, the MOS would be unable to unlock the encrypted OS image.

Once the updated OS image has been copied onto the primary disk at block 426, the system can again be rebooted at block 428. Upon rebooting, control can be transferred from the MOS/MOS provisioning agent 408 to the updated OS/OS provisioning agent, which can check and prepare the data volumes of the server at block 432.

A further step in securely provisioning a server is to encrypt the data volumes. In some embodiments, the encryption of the data volumes can be accomplished using either of two approaches.

In a first approach, encryption can be enabled on the data volumes during initialization of the OS, in addition auto-unlock (available in BitLocker), or a similar feature of any other disk encryption applications, can be enabled on the data volumes in the OS. During the OS upgrade scenario described above where a server updates itself, the imaging service can inject the decryption keys for the data volumes into the newly created OS image. In such embodiments, when the newly created OS image boots, it can utilize the decryption keys to unlock the data volumes and, in some embodiments, create new auto-unlock protectors, or a similar feature of any other disk encryption applications.

Using disk encryption (e.g., BitLocker) with a TPM can have the side effect that a server can boot into its primary OS if the boot components haven't been modified. This can expose a vulnerability to an attacker who has physical access to the server because such an attacker can have an infinite amount of time to find a vulnerability of the running OS after gaining physical possession of the server.

One mitigation to the above vulnerability is to store the decryption keys for the data volumes outside the OS itself. As such, in some embodiments an architecture is provided in which the server can retrieve the corresponding decryption key of the data volumes from a secure service (e.g., SSMS 116 of FIG. 1 or management service 304 of FIG. 3) upon startup after additional validation procedures have been passed. As such, in these embodiments, the OS provisioning agent, of the updated OS, can be configured to create a connection to the management service upon OS startup. The management service can perform policy checks to determine if the server is trustworthy. These policy checks can include, authentication of the server (e.g., based on the EKPub of the TPM of the server, as described above), determining whether the server has been reported stolen, determining whether the server is connecting using an expected IP address, i.e. the server hasn't been relocated unexpectedly; remote attestation utilizing the TPM of the server, as mentioned above; etc. In still other embodiments, updated OS/OS provisioning agent 410 in conjunction with the management service could perform a host attestation to ensure that the server's OS is in a known good state.

In some embodiments, the decryption keys for the data volumes can be handled by the OS provisioning agent creating a secure connection with the management service, initially on startup, and performing a mutual authentication (e.g., self-signed certificates for the server and the management service).

If upon startup, the data volumes are currently not protected by a disk encryption mechanism (e.g., in case of first-time install, recovery, repartition, etc.), the OS provisioning agent can be configured to reformat the volumes, then enable disk encryption, encrypt the decryption key with an encryption key protected by the TPM to bind the decryption key to the local TPM, and send the bound decryption key to the management service. The management service can store the encrypted key in a secure store (e.g., a key database), for later retrieval (e.g., after authentication of the server as described above).

If, on the other hand, the data volumes are currently protected by a disk encryption mechanism, the OS provisioning agent can request the encrypted keys from the management service, decrypt the encrypted keys using the server's TPM, and mount the volumes.

Turning now to FIG. 5, provisioning servers for a cloud computing system from a central location can help to maintain the integrity of the cloud computing system; however, the amount of bandwidth that is utilized by such a scenario may not be desirable. As such, in some embodiments, it may be beneficial to enable servers that are outside the central location, but trustworthy, to provision servers that are within a closer proximity, either network or geographic, to those trustworthy servers (e.g., servers within the same rack, facility, or within a certain geographic proximity). The determination of whether a server is trustworthy can be accomplished in a similar manner to that described in reference to blocks 312 and 314 of FIG. 3. This can be especially beneficial when each server is similarly provisioned.

FIG. 5 is an interaction diagram depicting an illustrative process flow 500 for de-centralized provisioning of servers, in accordance with various embodiments of the present disclosure. Servers 1-8 can be located within the same destination facility or among different destination facilities, but within a certain geographic, or network, proximity. In a particular embodiment, each of servers 1-8 can be located within a single server rack. In such an embodiment, the servers would be considered intra-rack peers of one another. As can be seen, the interaction diagram depicts the interaction of nine entities, a home cluster 502 and servers 1-8. It will be appreciated that the depiction of 8 servers is merely selected for ease of explanation and that additional, or fewer, servers can be included without departing from the scope of this disclosure.

The first portion 504 of process flow 500, depicts home cluster 502 receiving an image request from each of servers 1-8. Each of the depicted image requests can be handled within home cluster 502 in a manner similar to that described in reference to FIG. 3. In response to the image requests, home cluster can identify an entity to which to delegate the imaging of each of servers 1-8. As depicted within the second portion 506 of process flow 500, the OS images for servers 1 and 2 are generated in a centralized manner from within home cluster 502.

Each of the OS images can include an instance of an imaging service to enable each provisioned server to then provision the next servers. As such, once servers 1 and 2 have received the respective OS image, servers 1 and 2 can then be selected by home cluster 502 to provision other servers that are within a geographic, or network, proximity of servers 1 and 2, so long as servers 1 and 2 remain trustworthy. As such, the provisioning of servers 3 and 4 is delegated to servers 1 and 2, as depicted within the third portion 508 of process flow 500.

Again, each of the OS images can include an instance of an imaging service to enable each provisioned server to then provision the next servers. As such, once servers 3 and 4 have received the respective OS image, servers 1-4 can then be selected by home cluster 502 to provision other servers that are within a geographic proximity, or network proximity, of servers 1-4, so long as servers 1-4 remain trustworthy. As such, the provisioning of servers 5-8 is delegated to servers 1-4, as depicted within the fourth portion 510 of process flow 500. As can be seen, with each iteration of OS images, the number of imaging services can double. As such, if 16 servers were depicted, then the next 8 servers, servers 9-16 (not depicted), could be provisioned by the depicted servers 1-8.

It will be appreciated that, in addition to initially provisioning an OS, the embodiments described above can also be utilized to securely install an OS onto a server while the server has an existing untrustworthy OS installed. As an example, the remote imaging between the home cluster and servers 1 and 2 can act to bring those servers back to a trustworthy state. As another example, the local imaging between the servers (e.g., that depicted in 508 or 510) can also be utilized to bring a server back to a trustworthy state. The effect of this is that, the embodiments described above can be used to re-establish trust in a server environment in the event a server environment has been compromised by a security breach (e.g. malware).

Figure 6:
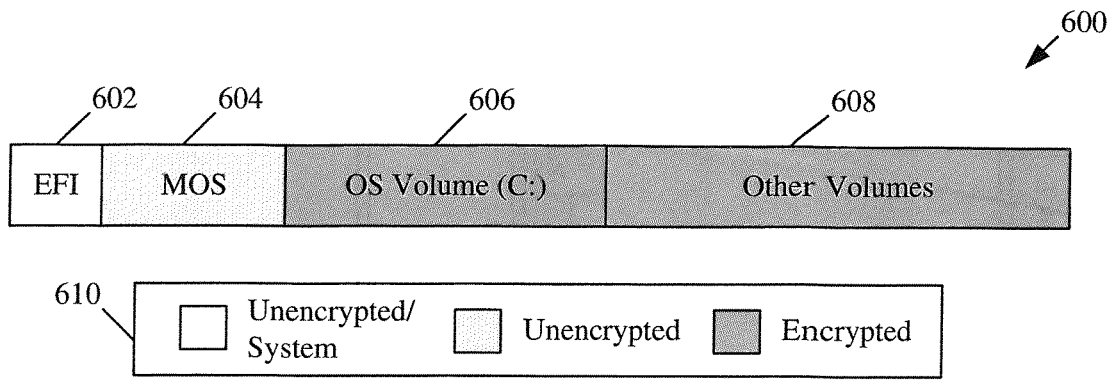
FIG. 6 depicts a hard disk layout of a server, in accordance with various embodiments of the present disclosure.

Turning to FIG. 6, FIG. 6 depicts a hard disk layout 600 of a server (e.g., server 104 of FIG. 1) in accordance with various embodiments of the present disclosure. As depicted, hard disk layout 600 includes an EFI volume 602 in which the OS boot loader can reside. In embodiments, the maintenance OS (MOS) (e.g., WinPE) can be installed locally on the hard disk in MOS volume 604. In such embodiments, the MOS of the server can be configured in a dual-boot configuration with the primary OS installed in OS volume 606. In such embodiments, the MOS can be configured as default OS in a boot configuration (e.g., boot configuration data (BCD)) of the server. In such a configuration, the server will initially boot into the MOS. Once the MOS has determined that the primary OS is not in need of servicing (e.g., the primary OS is properly provisioned and up to date), the MOS can perform a one-time boot into the primary OS. This configuration can ensure that the MOS will be booted in case there are any issues with the primary OS. In instances where the primary OS does a planned reboot repair action, the primary OS can configure the boot configuration to perform a one-time boot of itself.

In some instances, the server might be unable to boot, for example, if the EFI boot volume 602 or the MOS volume 604 becomes corrupted, there is a physical problem with the hard disk, or the hard disk has been replaced. In case of such instances, in some embodiments network boot (e.g., PXE boot) from the server's home cluster can be configured as a first boot option for instances in which such network boot is available. In instances where network boot is available from the home cluster (e.g., via VPN, via hypertext terminal protocol secure (HTTPS) utilizing UEFI 2.5, etc.), in order to provide the local MOS a chance to boot first, a grace period during which servers that have a local MOS during will not attempt to booted over the network. Such a grace period can be of short duration (e.g., in the order of one minute) although the duration can be longer or shorter depending on configuration. The BIOS of servers that have a local MOS installation can be configured to attempt network boot of a MOS first to enable recovery from, for example, a corrupted disk installation otherwise.

Network boot from the home cluster may not always be available from the server's home cluster. For example, in instances of PXE that utilize a VPN tunnel to connect with the server's home cluster, maintaining the VPN tunnel may no longer be desired and the VPN tunnel may therefore be removed. In such embodiments a proxy boot service running in remote locations of the cloud computing system can serve as a MOS relay. The service can maintain a connection to the server's home cluster to track servers that need to be recovered. The proxy boot service can act as a MOS server for those servers and can provide a corresponding MOS image. Depending on the network environment, peer servers can operate as dynamic host configuration protocol (DHCP) servers (in case there is no other DHCP server to respond to DHCP requests for these servers), or as a ProxyDHCP server (in case there is a DHCP server in the network environment).

Figure 7:
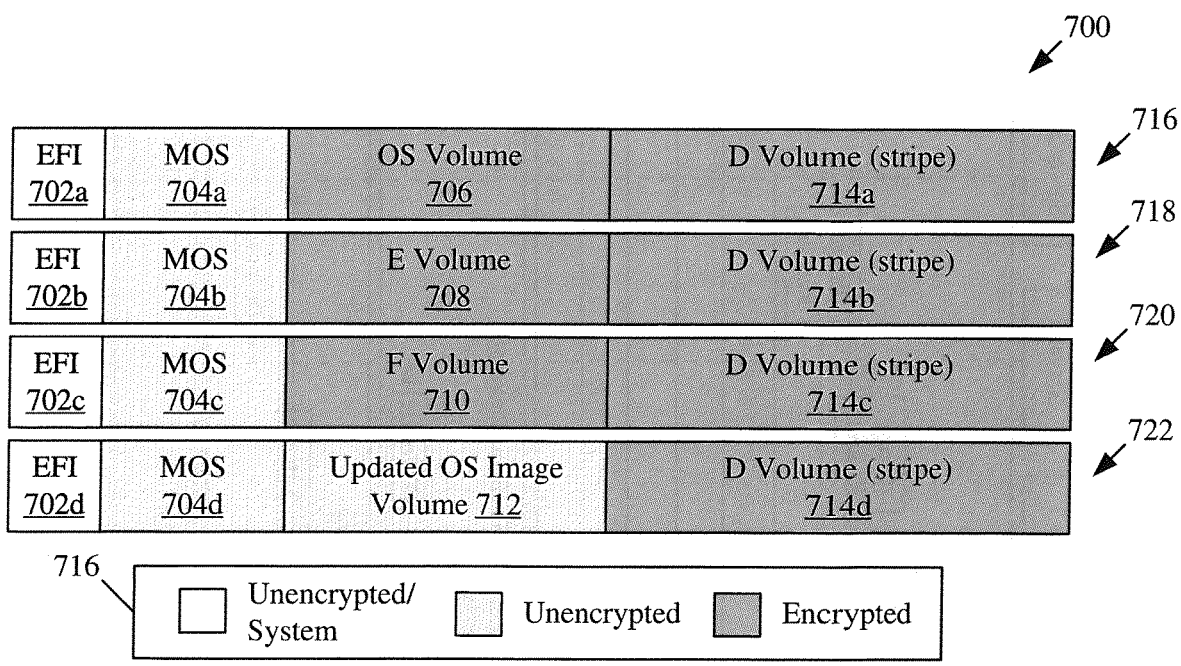
FIG. 7 depicts a plurality of hard disks of a server configured in a striped layout, in accordance with various embodiments of the present disclosure.

FIG. 7 depicts a plurality of hard disks 716-722 of a server configured in a striped layout, in accordance with various embodiments of the present disclosure. As depicted, the D Volume 714a-714d is spread across available hard disks 716-722, respectively. In the above described installation scenarios it was mentioned that, in some embodiments, the OS image is created in an unencrypted portion of the hard disk. The D, E, and F volumes can be any other volumes of the server and are not discussed in any detail. In the depicted example, the OS-volume 706 on the first disk 716 results in disk space on the other disks that may not be able to be used by a disk management system of a server. In such embodiments, the layout of these extra volumes can be leveraged by repurposing one of the extra volumes as an unencrypted volume, updated OS image volume 712, to store the image for the OS upgrade. To avoid accidental use of an unencrypted volume for sensitive data, in some embodiments, the updated OS image volume 712 may not be assigned a drive letter. While four hard disks, 716-722, are depicted, it will be appreciated that this approach can work for any number of hard disks greater than one. For example, if the server only included hard disk 716 and 718, E volume 718 could be repurposed as the updated OS image volume.

In addition, the proposed usage of a MOS image on the local hard disk may fail if there is a corruption of the MOS image, complete failure of the hard disk on which the MOS image is located, or replacement of the hard disk on which the MOS image is located with an empty disk. In an effort to provide a more robust solution, disk layout 700 can be further repurposed by providing multiple MOS volumes 704a-704d, rather than merely including a single MOS volume 704a on the first disk 716. Each of MOS volumes 704b-704d can include a clone of the MOS volume 704a from the first disk 716. In addition, disk layout 700 can be even further repurposed by providing multiple EFI volumes 702a-702d, rather than merely including a single EFI volume on the first disk 716. Each of EFI volumes 702b-702d can include a clone of the EFI volume 702a from the first disk 716. It should be noted that adding the EFI and MOS partitions to all of disks 716-722 does not necessarily reduce the size of the disk stripe because the D-volume is size-limited by the smallest stripe size which would be determined by taking into account the size of the EFI volume, MOS volume, and OS volume on disk 716.

Figure 8:
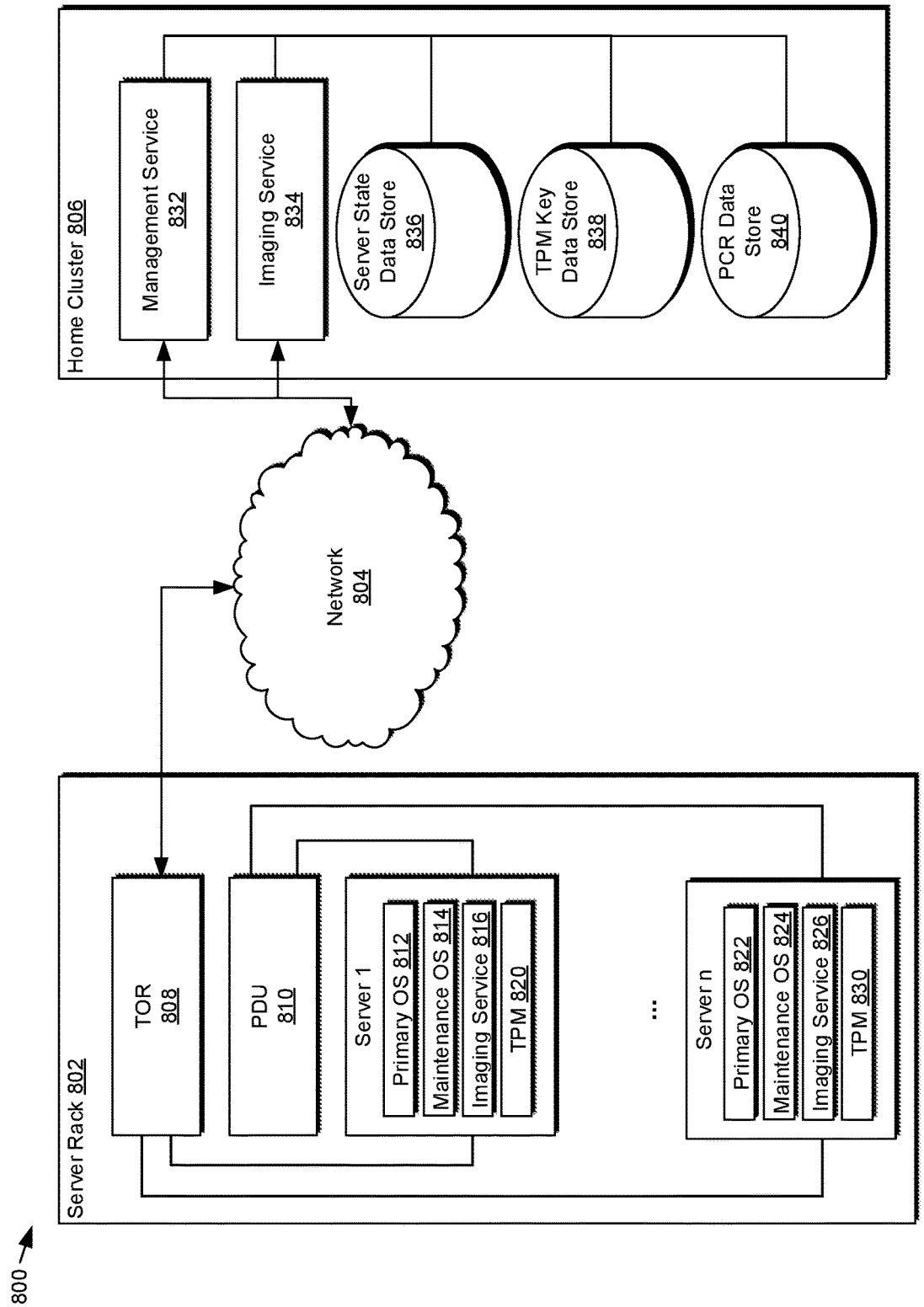
FIG. 8 depicts an illustrative cloud computing environment in which embodiments of the present disclosure can be implemented.

FIG. 8 depicts an illustrative cloud computing environment 800 in which embodiments of the present disclosure can be implemented. Cloud environment 800 includes server rack 802, network 804, and home cluster 806. Network 804 can be any combination of wired and/or wireless network. In embodiments, server rack 802 can include a top of rack (TOR) 808 communicatively coupled with each of servers 1-n. TOR 808 can be configured to provide network communications between servers 1-n and home cluster 806, as well as any other network resources. Server rack 802 can also include a power distribution unit (PDU) 810 electrically coupled with each of servers 1-n. PDU 810 can provide a source of power to servers 1-n to enable servers 1-n to maintain an operational state. Each of servers 1-n are depicted as having been provisioned as described above. As such each of servers 1-n includes a primary OS 812 and 822, a maintenance OS 814 and 824, an imaging service 816, and TPM 820 and 830. Each of these components can be configured to provide the functionality described herein with respect to each of these components.

Home cluster 806 includes a management service 832, an imaging service 834, a server state data store 836, a TPM key data store 838, and a PCR data store 840. The management service 832 can be configured in a similar manner to SSMS 116 of FIG. 1 and management service 304 of FIG. 3. As such, management service 832 can be configured to manage secure provisioning of servers within cloud computing environment 800 as described herein. Imaging service 834 can be configured in a similar manner to SSIS 124 of FIG. 1 and imaging service 306 of FIG. 3. As such, imaging service 834 can be configured to generate OS images (e.g., primary OS 812 and primary OS 822) for deployment to servers within cloud computing environment 800. Server state data store 836 can be configured to store information regarding a server's state, such as, for example, whether server has been reported stolen, an expected IP address or range of IP addresses that a server may utilize in connecting with home cluster 806, or any other server state information discussed herein. TPM key data store 838 can be configured to store the EKPub of each TPM (e.g., TPM 820 and TPM 830). These EKPubs can be stored in TPM key data store 838 in a same or similar manner to that described herein. PCR data store 840 can be configured to store expected PCR values cross-referenced with the configurations that would produce those PCR values. Such PCR values can be utilized in the sealing operations described above, as described herein.

Having briefly described an overview of embodiments of the present disclosure, an illustrative operating environment in which embodiments of the present disclosure may be implemented is described below in order to provide a general context for various aspects of the present disclosure.

Figure 9:
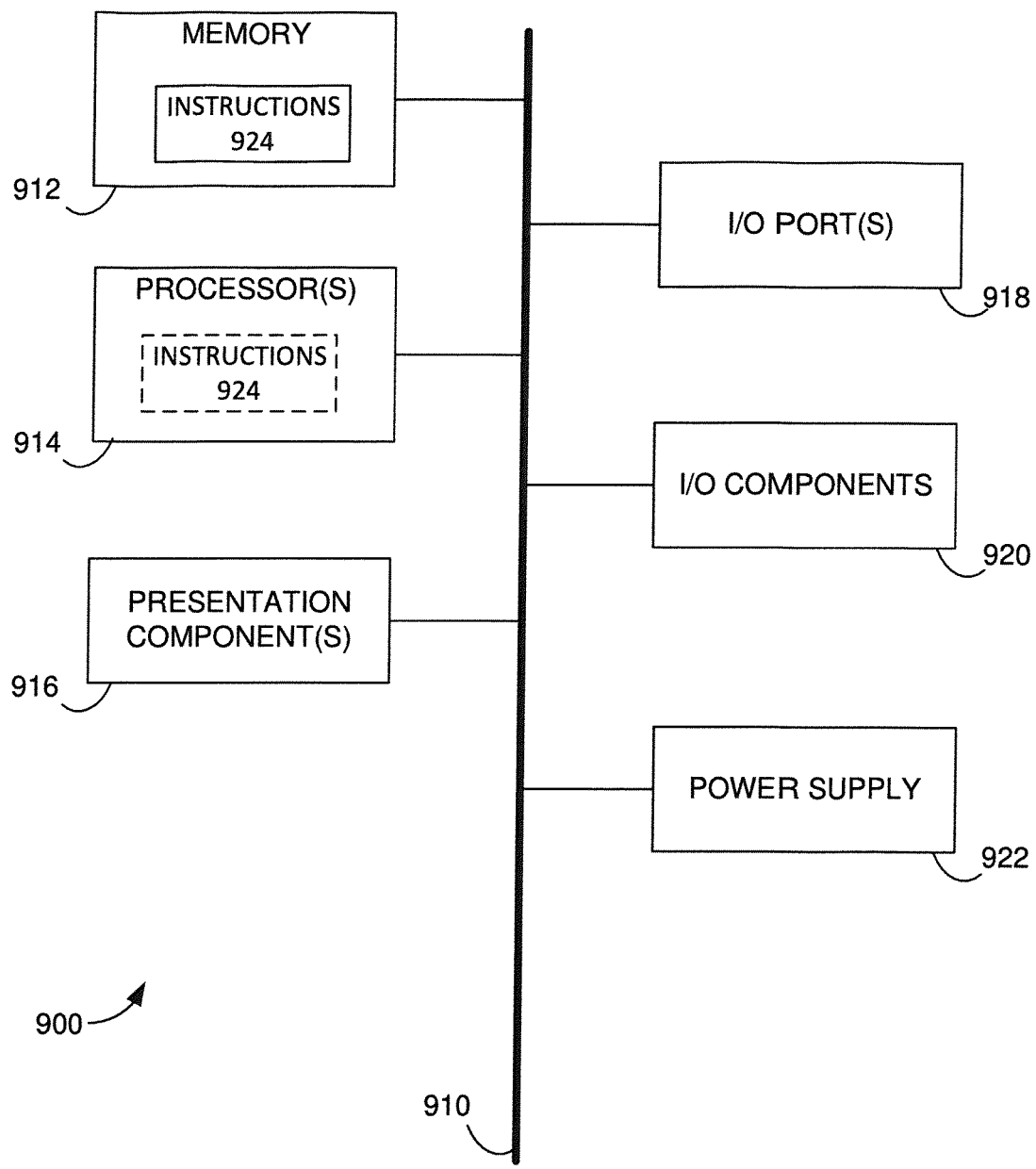
FIG. 9 depicts an illustrative operating environment for implementing embodiments of the present disclosure.

Referring initially to FIG. 9 in particular, an illustrative operating environment for implementing embodiments of the present disclosure is shown and designated generally as computing device 900. Computing device 900 is but one example of a suitable computing environment and is not intended to suggest any limitation as to the scope of use or functionality of the disclosure. Neither should the computing device 900 be interpreted as having any dependency or requirement relating to any one or combination of components illustrated.

The disclosure may be described in the general context of computer code or machine-useable instructions, including computer-executable instructions such as program modules or engines, being executed by a computer or other machine, such as a personal data assistant or other handheld device. Generally, program modules including routines, programs, objects, components, data structures, etc. refer to code that perform particular tasks or implement particular abstract data types. The disclosure may be practiced in a variety of system configurations, including hand-held devices, consumer electronics, general-purpose computers, more specialty computing devices, etc. The disclosure may also be practiced in distributed computing environments where tasks are performed by remote-processing devices that are linked through a communications network.

With reference to FIG. 9, computing device 900 includes a bus 910 that directly or indirectly couples the following devices: memory 912, one or more processors 914, one or more presentation components 916, input/output ports 918, input/output components 920, and an illustrative power supply 922. Bus 910 represents what may be one or more busses (such as an address bus, data bus, or combination thereof). Although the various blocks of FIG. 9 are shown with clearly delineated lines for the sake of clarity, in reality, such delineations are not so clear and these lines may overlap. For example, one may consider a presentation component such as a display device to be an I/O component, as well. Also, processors generally have memory in the form of cache. We recognize that such is the nature of the art, and reiterate that the diagram of FIG. 9 is merely illustrative of an example computing device that can be used in connection with one or more embodiments of the present disclosure. Distinction is not made between such categories as "workstation," "server," "laptop," "hand-held device," etc., as all are contemplated within the scope of FIG. 9 and reference to "computing device."

Computing device 900 typically includes a variety of computer-readable media. Computer-readable media can be any available media that can be accessed by computing device 900 and includes both volatile and nonvolatile media, removable and non-removable media. By way of example, and not limitation, computer-readable media may comprise computer storage media and communication media.

Computer storage media include volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information. Computer-readable storage media excludes signals per se.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 912 includes computer storage media in the form of volatile and/or nonvolatile memory. As depicted, memory 912 includes instructions 924. Instructions 924, when executed by processor(s) 914 are configured to cause the computing device to perform any of the operations described herein, in reference to the above discussed figures. The memory may be removable, non-removable, or a combination thereof. Illustrative hardware devices include solid-state memory, hard drives, optical-disc drives, etc. Computing device 900 includes one or more processors that read data from various entities such as memory 912 or I/O components 920. Presentation component(s) 916 present data indications to a user or other device. Illustrative presentation components include a display device, speaker, printing component, vibrating component, etc.

I/O ports 918 allow computing device 900 to be logically coupled to other devices including I/O components 920, some of which may be built in. Illustrative components include a microphone, joystick, game pad, satellite dish, scanner, printer, wireless device, etc.

Figure 10:
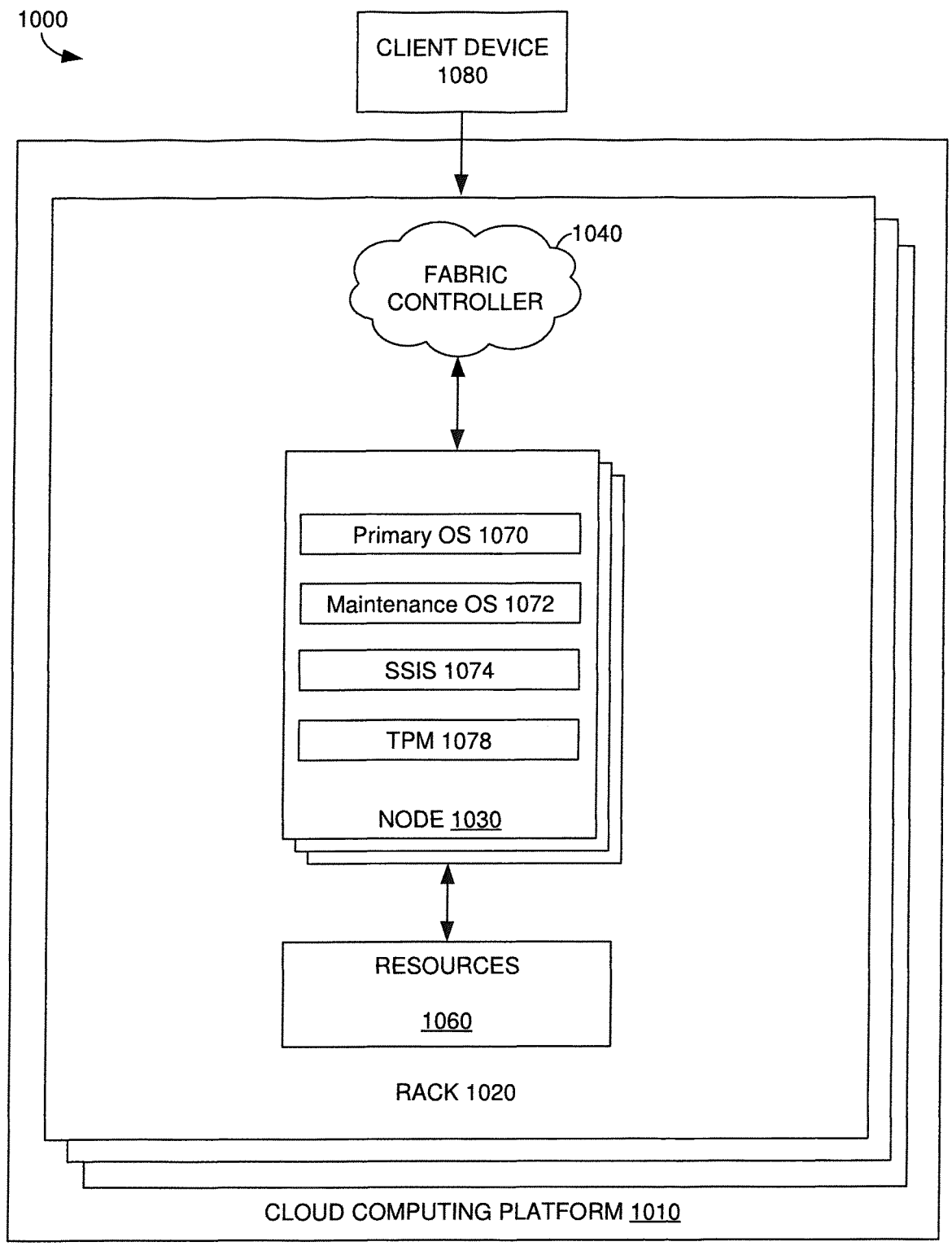
FIG. 10 depicts an illustrative distributed computing environment in which implementations of the present disclosure may be employed.

Referring now to FIG. 10, FIG. 10 illustrates an illustrative distributed computing environment 1000 in which implementations of the present disclosure may be employed. In particular, FIG. 10 shows an illustrative network system comprising a cloud computing platform 1010, where the system supports the secure OS provisioning described above. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Data centers can support the distributed computing environment 1000 that includes the cloud computing platform 1010, rack 1020, and node 1030 (e.g., computing devices, processing units, or blades) in rack 1020. The system can be implemented with a cloud computing platform 1010 that runs cloud services across different data centers and geographic regions. The cloud computing platform 1010 can implement a fabric controller 1040 component for provisioning and managing resource allocation, deployment, upgrade, and management of cloud services. Typically, the cloud computing platform 1010 acts to store data or run service applications in a distributed manner. The cloud computing platform 1010 in a data center can be configured to host and support operation of endpoints of a particular service application. The cloud computing platform 1010 may be a public cloud, a private cloud, or a dedicated cloud.

The node 1030 can be provisioned in a similar manner to servers 1-n of FIG. 8. As such, node 1030 can include a primary OS 1070, a maintenance OS 1072, an imaging service 1074, and a TPM 1078. Each of these components can perform any of the processes described above with respect to each of these components. In addition, node 1030 can also be configured to perform specialized functionality (e.g., compute nodes or storage nodes) within the cloud computing platform 1010. The node 1030 can be allocated to run one or more portions of a service application of a tenant. A tenant can refer to a customer utilizing resources of the cloud computing platform 1010. Service application components of the cloud computing platform 1010 that support a particular tenant can be referred to as a tenant infrastructure or tenancy. The terms service application, application, or service are used interchangeably herein and broadly refer to any software, or portions of software, that run on top of, or access storage and compute device locations within, a datacenter.

When more than one separate service application is being supported by the nodes 1030, the nodes may be partitioned into virtual machines. Physical machines can also concurrently run separate service applications. The virtual machines or physical machines can be configured as individualized computing environments that are supported by resources 1060 (e.g., hardware resources and software resources) in the cloud computing platform 1010. It is contemplated that resources can be configured for specific service applications. Further, each service application may be divided into functional portions such that each functional portion is able to run on a separate virtual machine. In the cloud computing platform 1010, multiple servers may be used to run service applications and perform data storage operations in a cluster. In particular, the servers may perform data operations independently but exposed as a single device referred to as a cluster. Each server in the cluster can be implemented as a node.

Client device 1080 may be linked to a service application in the cloud computing platform 1010. The client device 1080 may be any type of computing device, which may correspond to computing environment 1000 described with reference to FIG. 10, for example. The client device 1080 can be configured to issue commands to cloud computing platform 1010. In embodiments, client device 1080 may communicate with service applications through a virtual Internet Protocol (IP) and load balancer or other means that directs communication requests to designated endpoints in the cloud computing platform 1010. The components of cloud computing platform 1010 may communicate with each other over a network (not shown), which may include, without limitation, one or more local area networks (LANs) and/or wide area networks (WANs).

Having described various aspects of the distributed computing environment 1000 and cloud computing platform 1010, it is noted that any number of components may be employed to achieve the desired functionality within the scope of the present disclosure. Although the various components of FIG. 10 are shown with lines for the sake of clarity, in reality, delineating various components is not so clear, and metaphorically, the lines may more accurately be grey or fuzzy. Further, although some components of FIG. 10 are depicted as single components, the depictions are exemplary in nature and in number and are not to be construed as limiting for all implementations of the present disclosure.

Embodiments presented herein have been described in relation to particular embodiments which are intended in all respects to be illustrative rather than restrictive. Alternative embodiments will become apparent to those of ordinary skill in the art to which the present disclosure pertains without departing from its scope.

From the foregoing, it will be seen that this disclosure in one well adapted to attain all the ends and objects hereinabove set forth together with other advantages which are obvious and which are inherent to the structure.

It will be understood that certain features and sub-combinations are of utility and may be employed without reference to other features or sub-combinations. This is contemplated by and is within the scope of the claims.

In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in a limiting sense, and the scope of embodiments is defined by the appended claims and their equivalents.

Various aspects of the illustrative embodiments have been described using terms commonly employed by those skilled in the art to convey the substance of their work to others skilled in the art. However, it will be apparent to those skilled in the art that alternate embodiments may be practiced with only some of the described aspects. For purposes of explanation, specific numbers, materials, and configurations are set forth in order to provide a thorough understanding of the illustrative embodiments. However, it will be apparent to one skilled in the art that alternate embodiments may be practiced without the specific details. In other instances, well-known features have been omitted or simplified in order not to obscure the illustrative embodiments.

Various operations have been described as multiple discrete operations, in turn, in a manner that is most helpful in understanding the illustrative embodiments; however, the order of description should not be construed as to imply that these operations are necessarily order dependent. In particular, these operations need not be performed in the order of presentation. Further, descriptions of operations as separate operations should not be construed as requiring that the operations be necessarily performed independently and/or by separate entities. Descriptions of entities and/or modules as separate modules should likewise not be construed as requiring that the modules be separate and/or perform separate operations. In various embodiments, illustrated and/or described operations, entities, data, and/or modules may be merged, broken into further sub-parts, and/or omitted.

The phrase "in one embodiment" or "in an embodiment" is used repeatedly. The phrase generally does not refer to the same embodiment; however, it may. The terms "comprising," "having," and "including" are synonymous, unless the context dictates otherwise. The phrase "A/B" means "A or B." The phrase "A and/or B" means "(A), (B), or (A and B)." The phrase "at least one of A, B and C" means "(A), (B), (C), (A and B), (A and C), (B and C) or (A, B and C)."

What is claimed is:

1. A computerized system comprising:
one or more computer processors; and
computer memory storing computer-useable instructions that, when used by the one or more computer processors, cause the one or more computer processors to perform, using a secure server management service, operations comprising:

receiving a request, from a server in a first computing environment, to securely provision an operating system for the server associated with a cloud computing system, the server having a hardware encryption module associated with a key, wherein the request comprises an authentication request to authenticate, secure presence of the server in the first computing environment;

authenticating presence of the server, wherein authenticating presence of the server comprises:
(1) retrieving a public key associated with the hardware encryption module of the server, wherein the public key is retrieved from a data store in which the public key was stored in the cloud computing system;
(2) authenticating the server utilizing the public key; and
(3) in response to a successful authentication of the server, identifying an imaging service to provision the operating system image;

based on authenticating secure presence of the server in the first computing environment, causing, the imaging service, to provision the operating system on the first server, wherein provisioning the operating system comprises the imaging service executing the following:

accessing an operating system image for the server;
encrypting the operating system image, utilizing an encryption key; and
causing the server to be provisioned with the operating system image.

2. The system of claim 1, the operations further comprising receiving the authentication request from the server, as part of authenticating the secure presence of the server in the first computing environment, wherein the first computing environment is identified as a physically unsecure computing environment.

3. The system of claim 1, wherein the hardware encryption module is a trusted platform module.

4. The system of claim 1, the operations further comprising:
retrieving state information associated with the server, the state information including an indicator of one or more of:
whether the server has been reported stolen, and
an expected internet protocol address of the server; and
validating the state information of the server, wherein identifying the imaging service of the cloud computing environment to which to delegate generating the operating system image is also in response to successful validation of the server.

5. The system of claim 1, the operations further comprising transmitting to the server a selected imaging service notification that includes an identifier associated with the identified imaging service to enable the server to submit an imaging request to the identified imaging service.

6. The system of claim 1, the operations further comprising communicating, to the imaging service, an image delegation notification that identifies the server to be provisioned with the operating system image, wherein the image delegation notification is received at the imaging service based on the imaging service being selected based on a geographic proximity of the image server to the server.

7. The system of claim 1, wherein the request is a first request, the server is a first server, and the imaging service is a first imaging service, and wherein the secure server management service is further to:

receive a second request from a second server for secure provisioning of an operating system for the second server, the second request including an identifier of the second server; and
identifying a second imaging service located on the first server to which to delegate generating an operating system image for the second server.

8. One or more hardware computer-storage media having computer-executable instructions embodied thereon that, when executed by a computing system having a processor and memory, cause the processor to:

receive a request, from a server in a first computing environment, to securely provision an operating system for the server associated with a cloud computing system, the server having a hardware encryption module comprising associated with a key, wherein the request comprises an authentication request to verify authenticate, secure presence of the server in the first computing environment;

authenticate presence of the server, wherein authenticating presence of the server comprises:
(1) retrieving a public key associated with the hardware encryption module of the server, wherein the public key is retrieved from a data store in which the public key was stored in the cloud computing system;
(2) authenticating the server utilizing the public key; and
(3) in response to a successful authentication of the server, identifying an imaging service to provision the operating system image;

based on authenticating secure presence of the server in the first computing environment, cause, an imaging service to provision the operating system on the first server, wherein provisioning the operating system comprises the imaging service executing the following:

accessing an operating system image for the server;
encrypting the operating system image, utilizing an encryption key; and
causing the server to be provisioned with the operating system image.

9. The media of claim 8, the operations further comprising receiving the authentication request from the server, as part of authenticating the secure presence of the server in the first computing environment, wherein the first computing environment is identified as the physically unsecure computing environment.

10. The media of claim 8, wherein the hardware encryption module is a trusted platform module.

11. The media of claim 8, the operations further comprising:
retrieving state information associated with the server, the state information including an indicator of one or more of:
whether the server has been reported stolen, and
an expected internet protocol address of the server; and
validating the state information of the server, wherein identifying the imaging service of the cloud computing environment to which to delegate generating the operating system image is also in response to successful validation of the server.

12. The media of claim 8, the operations further comprising transmitting to the server a selected imaging service notification that includes an identifier associated with the identified imaging service to enable the server to submit an imaging request to the identified imaging service.

13. The media of claim 8, the operations further comprising communicating, to the imaging service, an image delegation notification that identifies the server to be provisioned with the operating system image, wherein the image delegation notification is received at the imaging service based on the imaging service being selected based on a geographic proximity of the image server to the server.

14. The media of claim 8, wherein the request is a first request, the server is a first server, and the imaging service is a first imaging service, and wherein the secure server management service is further to:
receive a second request from a second server for secure provisioning of an operating system for the second server, the second request including an identifier of the second server; and
identifying a second imaging service located on the first server to which to delegate generating an operating system image for the second server.

15. A computer-implemented method, the method comprising:
receiving a request, from a server in a first computing environment, to securely provision an operating system for the server associated with a cloud computing system, the server having a hardware encryption module associated with a key, wherein the request comprises an authentication request to authenticate, secure presence of the server in the first computing environment;
authenticating presence of the server, wherein authenticating presence of the server comprises:
(1) retrieving a public key associated with the hardware encryption module of the server, wherein the public key is retrieved from a data store in which the public key was stored in the cloud computing system;
(2) authenticating the server utilizing the public key; and
(3) in response to a successful authentication of the server, identifying an imaging service to provision the operating system image;
based on authenticating secure presence of the server in the first computing environment, causing, the imaging service, to provision the operating system on the first server, wherein provisioning the operating system comprises the imaging service executing the following:
accessing an operating system image for the server;
accessing an operating system image for the server;
encrypting the operating system image, utilizing an encryption key; and
causing the server to be provisioned with the operating system image.

16. The method of claim 15, the operations further comprising receiving the authentication request from the server, as part of authenticating the secure presence of the server in the first computing environment, wherein the first computing environment is identified as a physically unsecure computing environment.

17. The method of claim 15, wherein the hardware encryption module is a trusted platform module.

18. The method of claim 15, the operations further comprising:
retrieving state information associated with the server, the state information including an indicator of one or more of:
whether the server has been reported stolen, and
an expected internet protocol address of the server; and
validating the state information of the server, wherein identifying the imaging service of the cloud computing environment to which to delegate generating the operating system image is also in response to successful validation of the server.

19. The method of claim 15, the operations further comprising transmitting to the server a selected imaging service notification that includes an identifier associated with the identified imaging service to enable the server to submit an imaging request to the identified imaging service.

20. The method of claim 15, the operations further comprising communicating, to the imaging service, an image delegation notification that identifies the server to be provisioned with the operating system image, wherein the image delegation notification is received at the imaging service based on the imaging service being selected based on a geographic proximity of the image server to the server.

* * * * *